(12) United States Patent
Kordybach et al.

(10) Patent No.: US 12,439,312 B2
(45) Date of Patent: Oct. 7, 2025

(54) CONDITIONAL HANDOVER WITH BEAMFORMING AND SON INFORMATION

(71) Applicant: Nokia Solutions and Networks Oy, Espoo (FI)

(72) Inventors: Krzysztof Kordybach, Wrocław (PL); Ingo Viering, Munich (DE); Ahmad Awada, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 457 days.

(21) Appl. No.: 17/997,073

(22) PCT Filed: Apr. 30, 2020

(86) PCT No.: PCT/EP2020/062031
§ 371 (c)(1),
(2) Date: Oct. 25, 2022

(87) PCT Pub. No.: WO2021/219223
PCT Pub. Date: Nov. 4, 2021

(65) Prior Publication Data
US 2023/0189090 A1    Jun. 15, 2023

(51) Int. Cl.
*H04W 36/08* (2009.01)
*H04W 36/00* (2009.01)
(Continued)

(52) U.S. Cl.
CPC ..... *H04W 36/085* (2023.05); *H04W 36/0072* (2013.01); *H04W 36/0077* (2013.01);
(Continued)

(58) Field of Classification Search
CPC ............... H04W 36/08–087; H04W 36/085
See application file for complete search history.

(56) References Cited

U.S. PATENT DOCUMENTS 11,503,516 B2 * 11/2022 Byun ............... H04W 36/305
2017/0353870 A1 * 12/2017 Rybakowski ........ H04B 7/024
(Continued)

FOREIGN PATENT DOCUMENTS

CN        111083751 A     4/2020
EP          3609232 A1     2/2020
(Continued)

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.0.0, Dec. 2019, pp. 1-101.

(Continued)

*Primary Examiner* — Brendan Y Higa
(74) *Attorney, Agent, or Firm* — Lippes Mathias LLP (57) ABSTRACT

An apparatus comprising at least one processor, and at least one memory storing instructions that, when executed by the at least one processor, cause a target node at least to: transmit a target node beam information to a source node, wherein the target node beam information characterizes at least one beam of the target node accessed by a user equipment for a handover from the source node to the target node.

8 Claims, 4 Drawing Sheets

(51) Int. Cl.
　　*H04B 7/06*　　　(2006.01)
　　*H04W 36/36*　　(2009.01)
　　*H04W 74/0833*　(2024.01)
　　*H04W 74/0838*　(2024.01)

(52) U.S. Cl.
　　CPC ... *H04B 7/06952* (2023.05); *H04W 36/00833* (2023.05); *H04W 36/362* (2023.05); *H04W 74/0833* (2013.01); *H04W 74/0838* (2024.01)

(56) References Cited

U.S. PATENT DOCUMENTS

| | | | | |
|---|---|---|---|---|
| 2018/0324653 | A1* | 11/2018 | Nagaraja | H04W 74/002 |
| 2019/0110234 | A1 | 4/2019 | Peisa et al. | |
| 2019/0132778 | A1 | 5/2019 | Park et al. | |
| 2019/0141592 | A1* | 5/2019 | Park | H04W 76/18 |
| 2019/0349819 | A1* | 11/2019 | Xu | H04B 7/0695 |
| 2019/0349830 | A1* | 11/2019 | Peisa | H04W 74/0838 |
| 2020/0367125 | A1* | 11/2020 | Yoon | H04W 36/085 |
| 2020/0413392 | A1* | 12/2020 | Purkayastha | H04W 36/0088 |
| 2021/0410151 | A1* | 12/2021 | Chen | H04W 72/046 |
| 2022/0078678 | A1* | 3/2022 | Amuru | H04W 36/0058 |
| 2022/0141739 | A1* | 5/2022 | Fan | H04W 36/06 370/331 |

FOREIGN PATENT DOCUMENTS

| | | |
|---|---|---|
| WO | 2018/204863 A1 | 11/2018 |
| WO | 2019/003059 A1 | 1/2019 |
| WO | 2019/170210 A1 | 9/2019 |
| WO | 2019/245290 A1 | 12/2019 |
| WO | 2021/018382 A1 | 2/2021 |

OTHER PUBLICATIONS

"New Work Item on even further Mobility enhancement in E-UTRAN", 3GPP TSG RAN Meeting #80, RP-181337, Agenda: 10.1.1, China Telecom, Jun. 11-14, 2018, 4 pages.

"New WID: NR mobility enhancements", 3GPP TSG RAN Meeting #80, RP-181433, Agenda: 9.1.10, Intel Corporation, May 21-25, 2018, 5 pages.

Martikainen et al., "On the Basics of Conditional Handover for 5G Mobility", IEEE 29th Annual International Symposium on Personal, Indoor and Mobile Radio Communications (PIMRC), Sep. 9-12, 2018, 7 pages.

"IEEE 802.3", Wikipedia, Retrieved on Nov. 16, 2022, Webpage available at : https://en.wikipedia.org/wiki/ IEEE_802.3.

"3rd Generation Partnership Project; Technical Specification Group Services and System Aspects; System architecture for the 5G System (5GS); Stage 2 (Release 16)", 3GPP TS 23.501, V16.3.0, Dec. 2019, pp. 1-417.

"Conditional Handover in High Frequency", 3GPP TSG-RAN WG2 Meeting #105bis, R2-1903243, Agenda: 11.9.3, MediaTek Inc, Apr. 8-12, 2019, pp. 1-3.

"Triggering of Conditional Handover in NR", 3GPP TSG RAN WG2 #105, R2-1900405, Agenda: 11.9.3, Ericsson, Feb. 25-Mar. 1, 2019, pp. 1-6.

"Discussion on CHO trigger condition", 3GPP TSG-RAN WG2 #106, R2-1907431, Agenda: 11.9.3.1, Huawei, May 13-17, 2019, 2 pages.

"3rd Generation Partnership Project; Technical Specification Group Radio Access Network; NG-RAN; Xn application protocol (XnAP) (Release 15)", 3GPP TS 38.423, V15.0.0, Jun. 2018, pp. 1-195.

"3rd Generation Partnership Project; Technical Specification Group Radio Access Network; Evolved Universal Terrestrial Radio Access Network (E-UTRAN); X2 application protocol (X2AP) (Release 16)", 3GPP TS 36.423, V16.1.0, Mar. 2020, pp. 1-438.

"Baseline CR for introducing Rel-16 NR mobility enhancement", 3GPP TSG-RAN WG3 Meeting #107-e, R3-201452, Nokia, Feb. 24-Mar. 6, 2020, 156 pages.

"3rd Generation Partnership Project; Technical Specification Group Radio Access Network; NR; Physical layer procedures for data (Release 16)", 3GPP TS 38.214, V16.0.0, Dec. 2019, pp. 1-148.

International Search Report and Written Opinion received for corresponding Patent Cooperation Treaty Application No. PCT/EP2020/062031, dated Jan. 13, 2021, 16 pages.

"3rd Generation Partnership Project; Technical Specification Group Radio Access Network; Study on RAN-centric data collection and utilization for LTE and NR (Release 16)", 3GPP TR 37.816, V16.0.0, Jul. 2019, pp. 1-35.

"Report of RLM related issues upon handover", 3GPP TSG-RAN WG2 #105bis, R2-1900660, Agenda: 11.12.4, Ericsson, Feb. 25-Mar. 1, 2019, 6 pages.

Office action received for corresponding European Patent Application No. 20723829.6, dated Jun. 20, 2025, 7 pages.

* cited by examiner

CONDITIONAL HANDOVER WITH BEAMFORMING AND SON INFORMATION

RELATED APPLICATION

This application was originally filed as PCT Application No. PCT/EP2020/062031, filed on Apr. 30, 2020, which is incorporated herein by reference in its entirety.

FIELD OF THE DISCLOSURE

Various example embodiments relate to an apparatus comprising at least one processor.

Further embodiments relate to a method of operating related to such apparatus.

BACKGROUND

Wireless communications systems may e.g. be used for wireless exchange of information between two or more entities. Nodes and/or radio devices for wireless communications systems may comprise antenna systems which enable to provide a plurality of radio beams, e.g. covering different spatial regions.

SUMMARY

Various embodiments of the disclosure are set out by the independent claims. The exemplary embodiments and features, if any, described in this specification, that do not fall under the scope of the independent claims, are to be interpreted as examples useful for understanding various exemplary embodiments of the disclosure.

Some embodiments relate to an apparatus comprising at least one processor, and at least one memory storing instructions, the at least one memory and the instructions configured to, with the at least one processor, cause a target node to transmit a target node beam information to a source node, wherein the target node beam information characterizes at least one beam of the target node accessed by a user equipment for a handover from the source node to the target node, e.g. during the handover. As the target node beam information characterizes the at least one beam of the target node accessed by the user equipment for a handover, the target node beam information enables to identify the at least one beam of the target node. In some embodiments, this may enable e.g. the source node to collect the target node beam information, without involving the user equipment. In some embodiments, the so collected information may be used for statistics related to handovers.

In some embodiments, the apparatus may be an apparatus for a wireless communications system.

In some embodiments, the apparatus or its functionality, respectively, may be provided in a network element of the communications systems, for example in a base station, e.g. a gNodeB (gNB).

In some embodiments, the apparatus according to the embodiments or its functionality, respectively, may be used for or within wireless communications systems, e.g. networks, based on or at least partially adhering to third generation partnership project, 3GPP, radio standards such as 4G E-UTRAN, 5G NR (fifth generation new radio) or other radio access technology. In some embodiments, the apparatus according to the embodiments or its functionality, respectively, may be used for handover procedures of 5G NR-based communications systems.

According to some embodiments, the handover is a conditional handover, CHO, according to which the user equipment, after receipt of a handover command, waits until at least one execution condition is fulfilled, prior to executing the handover.

According to some embodiments, after receiving a handover command, e.g. a command to perform a CHO, the UE would not execute the handover immediately to the target cell but may rather wait until the at least one execution condition is fulfilled, which, in some embodiments, may take some time. As such, according to some embodiments, an information that the source cell or the corresponding source node, respectively, has about the UE at a preparation time for the CHO, such as a last serving beam from the source node, etc., may become outdated with respect to the time instant that the UE actually executes the CHO to the target cell or target node, respectively. According to some embodiments, this uncertainty may make it unclear to record handover statistics. According to some embodiments, handover statistics may be used for network optimization, e.g. for at least one of: tracking area optimization, interference coordination, load balancing, tilt optimization, handover optimization, etc.

According to some embodiments, an uncertainty related to an actual target cell and/or target beam at the instant where the CHO is actually performed may be avoided by the transmission of the target node beam information. According to some embodiments, this enables to record handover statistics, e.g. on cell level and/or beam level. According to some embodiments, based on these handover statistics network optimization may be performed.

According to some embodiments, the instructions, when executed by the at least one processor, further cause the target node to: determine a beam of the at least one beam used by the user equipment in a random access for executing the handover, provide the target node beam information based on the determined beam.

According to some embodiments, the instructions, when executed by the at least one processor, further cause the target node to: receive source node beam information from the source node, wherein the source node beam information characterizes a last beam of the source node used by the user equipment for, e.g. during, the handover.

According to some embodiments, the target node beam information further includes at least one index of a synchronization signal block associated with the target node, e.g., the target node on which the UE has performed a successful random access, and/or at least one index of a channel state information reference signal, CSI-RS, which characterizes a radio channel between the target node and the user equipment.

According to some embodiments, the instructions, when executed by the at least one processor, further cause the target node to perform at least one of: a) providing the target node beam information characterizing at least one synchronization signal associated with the target node, e.g., the target node on which the UE has performed a successful random access, b) providing the target node beam information characterizing at least one channel state information reference signal, CSI-RS, which characterizes a radio channel between the target node and the user equipment.

According to some embodiments, the target node beam information may characterize and/or comprise an index of a synchronization signal block, SSB and/or an index of a CSI-RS, e.g. on which the UE has performed a successful random access.

According to some embodiments, the source node (i.e., serving cell), may send and/or configure at least one, e.g. a plurality of, different contention-free random access (CFRA) preambles for the target node or target cell, e.g. depending on at least one of the target node beam information, the source node beam information, which e.g. characterizes a beam pair of the serving cell and the target cell at the time of handover.

According to some embodiments, a handover from a source cell or source node "A" to a target cell or target node "B" may occur on two beam-pair border: 1) from a beam "Y1" in the source (i.e., currently serving) cell A to a beam "Z1" in the target (i.e., future serving) cell B, and 2) from a beam "Y2" in the serving cell A to a beam "Z2" in the target cell B. According to some embodiments, herein, the source cell or source node may configure and/or send to the UE a CFRA preamble to beam Z1 when the UE is served by beam Y1 in the source cell, i.e., the source cell triggering a new CHO Request to the target cell for updating CHO command containing CFRA preamble, and with a CFRA preamble to beam Z2 when the UE is served with beam Y2 in the serving cell A.

According to some embodiments, the instructions, when executed by the at least one processor, further cause the target node to use at least one of the following elements for transmitting the target node beam information: a) a class-1 procedure using a response, b) a class-2 procedure without response.

According to some embodiments, the instructions, when executed by the at least one processor, further cause the target node to use at least one of the following elements for transmitting the target node beam information: a) a class-1 procedure using a response according to 3GPP TS 38.423, e.g. version 15.0.0, or 3GPP TS 36.423, b) a class-2 procedure without response according to 3GPP TS 38.423, e.g. version 15.0.0, or 3GPP TS 36.423.

According to some embodiments, the class-1 procedure may use a first message, e.g. from the target node to the source node, and a response message to the first message, the response message being transmitted from the source node to the target node. According to some embodiments, the class-2 procedure may use a first message, e.g. from the target node to the source node, wherein no response message to the first message may be provided.

According to some embodiments, the instructions, when executed by the at least one processor, further cause the target node to transmit the target node beam information using a signaling to indicate success of the handover to the source node.

According to some embodiments, the instructions, when executed by the at least one processor, further cause the target node to transmit the target node beam information based on or using a signaling message of the "Handover Success" type as e.g. defined by R3-201452, Baseline CR for introducing Rel-16 NR mobility enhancement, 3GPP TSG-RAN WG3 Meeting #107-e, E-meeting.

According to some embodiments, an optional and/or additional information element (IE) may be added to an existing signaling message of e.g. the "Handover Success" type, wherein the optional and/or additional IE may comprise the target node beam information.

Some embodiments relate to a method comprising: transmitting, by a target node, a target node beam information to a source node, wherein the target node beam information characterizes at least one beam of the target node accessed by a user equipment for a handover from the source node to the target node.

According to some embodiments, the method may be used for operating a node for a wireless communications system.

According to some embodiments, a gNB or another network element may be configured to at least temporarily perform the step of transmitting the target node beam information to the source node.

Some embodiments relate to an apparatus comprising means for causing a target node at least to: transmit a target node beam information to a source node, wherein the target node beam information characterizes at least one beam of the target node accessed by a user equipment for a handover from the source node to the target node.

According to some embodiments, the means may be configured to cause the target node to perform at least one further step of the embodiments explained above.

Some embodiments relate to an apparatus, e.g. for a wireless communications system, comprising at least one processor, and at least one memory storing instructions, the at least one memory and the instructions configured to, with the at least one processor, cause a source node at least to: receive a target node beam information from a target node, wherein the target node beam information characterizes at least one beam of the target node accessed by a user equipment for a handover from the source node to the target node.

According to some embodiments, the apparatus the instructions, when executed by the at least one processor, further cause the source node to transmit a source node beam information to the target node, wherein the source node beam information characterizes a last beam of the source node used by the user equipment for the handover.

Some embodiments relate to an apparatus for a wireless communications system, comprising at least one processor, and memory storing instructions that, when executed by the at least one processor, cause a source node of a handover carried out by a user equipment from the source node to a target node at least to: transmit a source node beam information to the target node, wherein the source node beam information characterizes a last beam of the source node used by the user equipment for the handover.

In some embodiments, the apparatus or its functionality, respectively, may be provided in a network element of the communications systems, for example in a base station, e.g. a gNodeB (gNB).

In some embodiments, the apparatus according to the embodiments or its functionality, respectively, may be used for or within wireless communications systems, e.g. networks, based on or at least partially adhering to third generation partnership project, 3GPP, radio standards such as 4G E-UTRAN, 5G NR (fifth generation new radio) or other radio access technology. In some embodiments, the apparatus according to the embodiments or its functionality, respectively, may be used for handover procedures of 5G NR-based communications systems.

According to some embodiments, the handover is a conditional handover, CHO, according to which the user equipment, after receipt of a handover command, waits until at least one execution condition is fulfilled, prior to executing the handover.

According to some embodiments, the instructions, when executed by the at least one processor, further cause the source node to receive a target node beam information from the target node, wherein the target node beam information characterizes at least one beam of the target node accessed by the user equipment for the handover.

According to some embodiments, the instructions, when executed by the at least one processor, further cause the source node to transmit the source node beam information to the target node upon at least one of: a) receipt of the target node beam information, e.g. from the target node, b) receipt of a signaling from the target node indicating success of the handover.

According to some embodiments, the signaling from the target node indicating success of the handover may comprise a message of the "Handover Success" type, cf. above.

According to some embodiments, the instructions, when executed by the at least one processor, further cause the source node to use a class-2 procedure without response or class-1 procedure using a response for transmitting the source node beam information.

According to some embodiments, the instructions, when executed by the at least one processor, further cause the source node to use a class-2 procedure or a response message of a class-1 procedure according to 3GPP TS 38.423, e.g. version 15.0.0, or 3GPP TS 36.423, for transmitting the source node beam information.

According to some embodiments, the source node beam information further includes at least one index of a synchronization signal block associated with the source node and/or at least one index of a channel state information reference signal, CSI-RS, which characterizes a radio channel between the source node and the user equipment.

According to some embodiments, the source node beam information may comprise at least one index of the last SSB/or CSI-RS that is Quasi co-located (QCL) with the demodulation reference signals (DMRS) of a PDCCH (Physical Downlink Control Channel)/and or PDSCH (Physical Downlink Share Channel), i.e., beams providing PDCCH and/or PDSCH.

Details related to the concept of Quasi-Colocation according to some embodiments may e.g. be found in 3GPP TS 38.214 V 16.0.0 (2019-12), 5.1.5.

According to some embodiments, the instructions, when executed by the at least one processor, further cause the source node to: send to and/or configure the user equipment with at least one contention-free random access channel preamble based on the source node beam information and the target node beam information, also cf. the above examples related to exemplary cells or nodes "A", "B", respectively.

According to some embodiments, the instructions, when executed by the at least one processor, further cause the source node to: configure at least one mobility parameter for the user equipment based on at least one of the source node beam information and the target node beam information, e.g. a (currently) serving beam of the source node and, e.g., a strongest beam detected for the target node.

According to some embodiments, the least one mobility parameter may be a cell individual offset, CIO.

According to some embodiments, if there are a lot of too early handovers from the serving cell A towards the target cell B on a first beam pair <(source cell A, beam Y1), (target cell B, beam Z1)>, then the serving cell may configure a larger CIO when the UE is served on beam Y1 and detecting a strong beam Z1 from the target cell B, i.e., setting a larger CIO to make the handover(s) later.

According to some embodiments, the source node beam information may comprise an index of last SSB and/or CSI-RS that is quasi co-located (QCL) with demodulation reference signals, DMRS, of a Physical Downlink Control Channel, PDCCH, and/or a Physical Downlink Shared Channel, PDSCH Some embodiments relate to a method comprising: transmitting, by a source node, a source node beam information to a target node, wherein the source node beam information characterizes a last beam of the source node used by a user equipment for a handover from the source node to the target node. According to some embodiments, a gNB or another network element may be configured to at least temporarily perform the step of transmitting the source node beam information to the target node.

According to some embodiments, a gNB or another network element may be configured to at least temporarily perform the step of transmitting the target node beam information to the source node and/or to at least temporarily perform the step of transmitting the source node beam information to the target node.

Some embodiments relate to an apparatus comprising means for causing a source node of a handover carried out by a user equipment from the source node to a target node at least to: transmit a source node beam information to the target node, wherein the source node beam information characterizes at least one beam of the source node used by the user equipment for the handover.

According to some embodiments, the means may be configured to cause the source node to perform at least one further step of the embodiments explained above.

Some embodiments relate to a communications system comprising at least one apparatus for a wireless communications system, e.g. a first apparatus, comprising at least one processor, and memory storing instructions that, when executed by the at least one processor, cause a target node of a handover carried out by a user equipment, UE, from a source node to the target node at least to: transmit a target node beam information to the source node, wherein the target node beam information characterizes at least one beam of the target node accessed by the user equipment for the handover, e.g. during the handover.

According to some embodiments, the system may comprise at least one apparatus for a wireless communications system, e.g. a second apparatus, comprising at least one processor, and memory storing instructions that, when executed by the at least one processor, cause a source node of a handover carried out by a user equipment from the source node to a target node at least to: transmit a source node beam information to the target node, wherein the source node beam information characterizes a last beam of the source node used by the user equipment for the handover.

Some embodiments relate to a communications system comprising at least one network element, e.g. a base station, for example gNB, the gNB comprising the first apparatus and/or the second apparatus.

Some embodiments relate to a use of the apparatus according to the embodiments and/or of the method according to the embodiments and/or of the system according to the embodiments for at least one of: a) recording the target node beam information and/or the source node beam information, e.g. by the network, b) planning handovers, e.g. conditional handovers, based on the target node beam information and/or the source node beam information, c) improving mobility robustness, e.g. based on the target node beam information and/or the source node beam information).

DESCRIPTION OF SOME EMBODIMENTS

Figure 1:
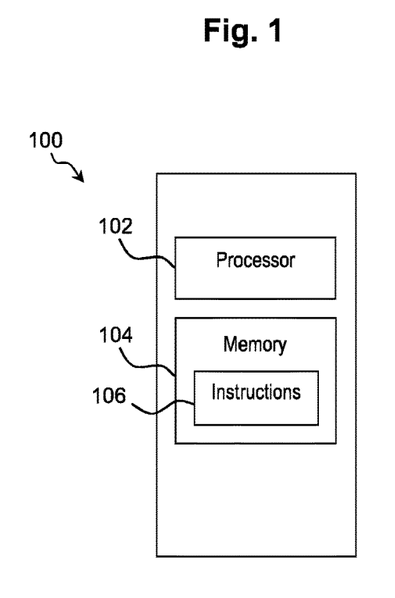
FIG. 1 schematically depicts a simplified block diagram of an apparatus according to some embodiments, FIG. 2 schematically depicts a simplified block diagram of an apparatus according to some embodiments, FIG. 3 schematically depicts a simplified block diagram of a system according to some embodiments, FIG. 4 schematically depicts a simplified flow-chart according to some embodiments.
Figure 4:
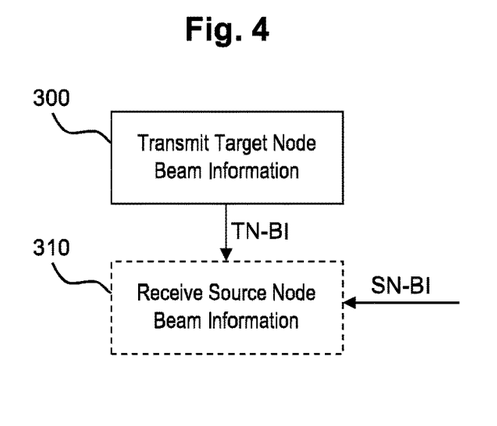

Some embodiments relate to an apparatus, e.g. for a wireless communications system. FIG. 1 schematically depicts a simplified block diagram of the apparatus 100 according to some embodiments, and FIG. 4 schematically depicts a simplified flow chart of a method of operating the apparatus 100 according to some embodiments. The apparatus 100 (FIG. 1) comprises at least one processor 102, and at least one memory 104 storing instructions 106 that, when executed by the at least one processor 102, cause a target node at least to, cf. FIG. 4: transmit 300 a target node beam information TN-BI to a source node 12, wherein the target node beam information TN-BI characterizes at least one beam of the target node accessed by a user equipment for a handover from the source node 12 to the target node 13, e.g. during the handover. In some embodiments, this may enable e.g. the source node 12 to collect the target node beam information TN-BI without involving the user equipment. In some embodiments, the so collected information may be used for statistics related to handovers.

Figure 3:
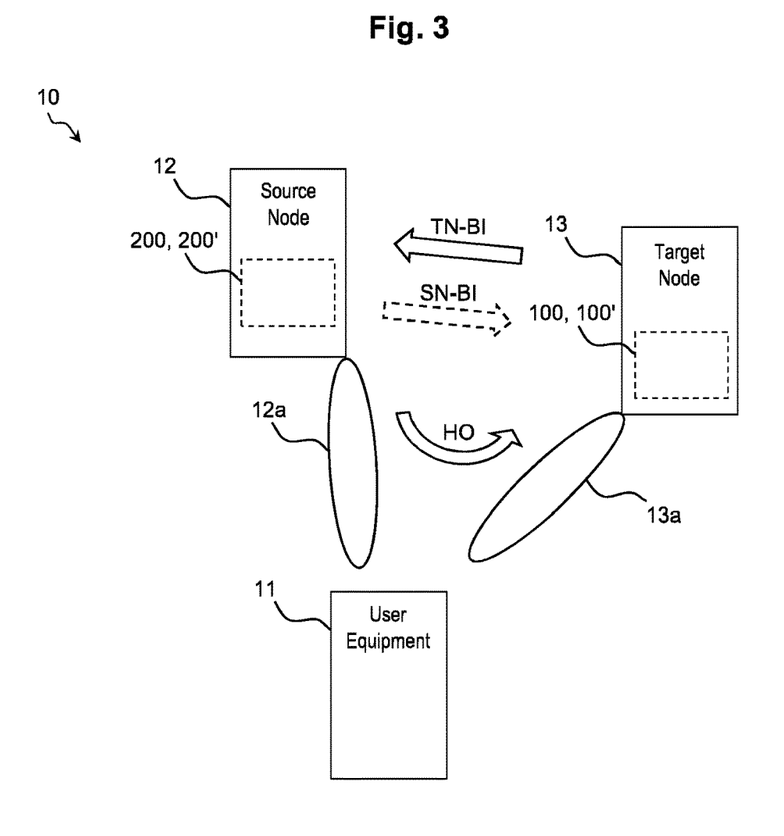

In some embodiments, the apparatus 100 (FIG. 1) or its functionality, respectively, may be provided in a network element of the communications system, for example in a base station, e.g. a gNodeB (gNB). This is schematically depicted by FIG. 3, which shows a communications system 10 according to some embodiments. As an example, a network element or node 13, e.g. a gNB 13, which may at least temporarily act as a target node for a handover HO of a user equipment 11 from a source node 12 to the target node 13, may comprise the apparatus 100 or its functionality.

In some embodiments, the apparatus 100 according to the embodiments or its functionality, respectively, may be used for or within wireless communications systems 10 (FIG. 3), e.g. networks, based on or at least partially adhering to third generation partnership project, 3GPP, radio standards such as 4G E-UTRAN, 5G NR (fifth generation new radio) or other radio access technology. In some embodiments, the apparatus 100 according to the embodiments or its functionality, respectively, may be used for handover procedures HO of 5G NR-based communications systems 10 cf. FIG. 3.

According to some embodiments, the handover HO is a conditional handover, CHO, according to which the user equipment 11, after receipt of a handover command, waits until at least one execution condition is fulfilled, prior to executing the handover HO.

According to some embodiments, after receiving a handover command, e.g. a command to perform a CHO, the UE 11 would not execute the handover immediately to the target cell or target node 13, respectively, but may rather wait until the at least one execution condition is fulfilled, which, in some embodiments, may take some time. As such, according to some embodiments, an information that the source cell or the corresponding source node 12, respectively, has about the UE 11 at a preparation time for the CHO, such as a last serving beam 12a from the source node, etc., may become outdated with respect to the time instant that the UE 11 actually executes the CHO to the target cell or target node 13, respectively. According to some embodiments, this uncertainty may make it unclear to record handover statistics. According to some embodiments, handover statistics may be used for network optimization, e.g. for at least one of: tracking area optimization, interference coordination, load balancing, tilt optimization, handover optimization, etc.

According to some embodiments, an uncertainty related to an actual target cell and/or target beam 13a at the instant where the CHO is actually performed may be avoided by the transmission 300 (FIG. 4) of the target node beam information TN-BI. According to some embodiments, this enables to record handover statistics, e.g. on cell level and/or beam level. According to some embodiments, based on these handover statistics network optimization may be performed.

Figure 5:
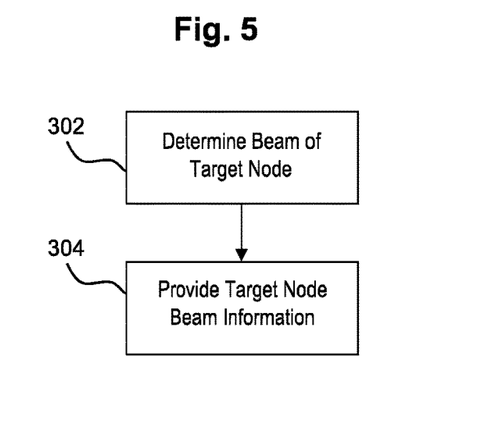
FIG. 5, 6, 7, 8, 9 each schematically depicts a simplified flow-chart according to some embodiments, FIG. 10 schematically depicts radio cells with beams according to some embodiments, FIG. 11 schematically depicts a simplified flow-chart according to some embodiments, and FIG. 12, 13 each schematically depicts a simplified block diagram of an apparatus according to some embodiments.

According to some embodiments, the instructions 106 (FIG. 1), when executed by the at least one processor 102, further cause the target node 13 (FIG. 3) to, cf. FIG. 5: determine 302 a beam of the at least one beam 13a (FIG. 3) used by the user equipment 11 in a random access for executing the handover HO, provide 304 (FIG. 5) the target node beam information TN-BI based on the determined beam 13a.

According to some embodiments, the instructions 106, when executed by the at least one processor 102, further cause the target node 13 to, cf. FIG. 4: receive 310 source node beam information SN-BI from the source node 12 (FIG. 3), wherein the source node beam information SN-BI characterizes a last beam 12a of the source node 12 used by the user equipment 11 for, e.g. during, the handover HO. Note that FIG. 4 schematically depicts an exemplary sequence of steps 300, 310, which, according to some embodiments, may also comprise another sequence.

According to some embodiments, the target node beam information may include at least one index of a synchronization signal block associated with the target node 13, e.g., the target node on which the UE has performed a successful random access, and/or at least one index of a channel state information reference signal, CSI-RS, which characterizes a radio channel between the target node and the user equipment.

Figure 6:
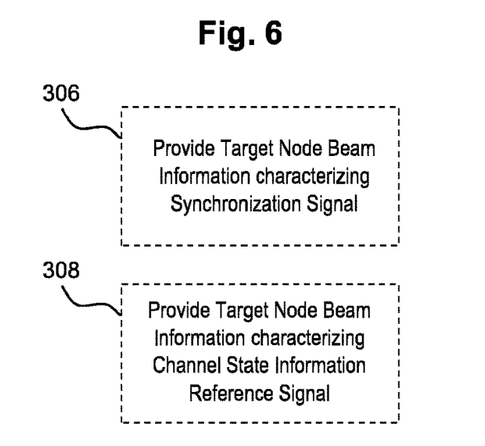

According to some embodiments, the instructions 106, when executed by the at least one processor 102, further cause the target node 13 to perform at least one of, cf. FIG. 6: a) providing 306 the target node beam information TN-BI characterizing at least one synchronization signal associated with the target node 13, e.g., the target node 13 on which the UE 11 has performed a successful random access, b) providing 308 the target node beam information TN-BI characterizing at least one channel state information reference signal, CSI-RS, which characterizes a radio channel between the target node 13 and the user equipment 11.

According to some embodiments, the target node beam information TN-BI may characterize and/or comprise an index of a synchronization signal block, SSB and/or an index of a CSI-RS, e.g. on which the UE 11 has performed a successful random access.

According to some embodiments, the source node 12 (FIG. 3) (i.e., serving cell), may send and/or configure at least one, e.g. a plurality of, different contention-free random access (CFRA) preambles for the target node 13 or target cell, e.g. depending on at least one of the target node beam information TN-BI, the source node beam information SN-BI, which e.g. characterizes a beam pair <12a, 13a> of the serving cell/node 12 and the target cell/node 13 at the time of handover HO.

According to some embodiments, assume that a handover HO from a source cell or source node "A" (e.g., similar to the source node 12 of FIG. 3) to a target cell or target node "B" (e.g., similar to the target node 13 of FIG. 3) may occur on a two beam-pair border: 1) from a beam "Y1" (not shown) in the source (i.e., currently serving) cell A to a beam "Z1" (not shown) in the target (i.e., future serving) cell B, and 2) from a beam "Y2" in the serving cell A to a beam "Z2" in the target cell B. According to some embodiments, herein, the source cell or source node may configure and/or send to the UE a CFRA preamble to beam Z1 when the UE is served by beam Y1 in the source cell, i.e. the source cell triggering a new CHO Request to the target cell for updating CHO command containing CFTA preamble, and with a CFRA preamble to beam Z2 when the UE is served with beam Y2 in the serving cell A.

According to some embodiments, the instructions 106 (FIG. 1), when executed by the at least one processor 102, further cause the target node 13 to use at least one of the following elements for transmitting 300 (FIG. 4) the target node beam information TN-BI: a) a class-1 procedure according to 3GPP TS 38.423, e.g. version 15.0.0, or 3GPP TS 36.423, b) a class-2 procedure according to 3GPP TS 38.423, e.g. version 15.0.0, 3GPP TS 36.423.

According to some embodiments, the class-1 procedure may use a first message, e.g. from the target node 13 to the source node 12 (cf. e.g. the block arrow TN-BI of FIG. 3), and a response message to the first message, the response message being transmitted from the source node 12 to the target node 13. According to some embodiments, the class-2 procedure may use a first message, e.g. from the target node 13 to the source node 12, wherein no response message to the first message may be provided.

According to some embodiments, the instructions 106, when executed by the at least one processor 102, further cause the target node 13 to transmit the target node beam information TN-BI using a signaling to indicate success of the handover HO to the source node 12.

According to some embodiments, the instructions 106, when executed by the at least one processor 102, further cause the target node 13 to transmit the target node beam information TN-BI based on or using a signaling message of the "Handover Success" type, cf. above.

According to some embodiments, an optional and/or additional information element (IE) may be added to an existing signaling message of e.g. the "Handover Success" type, wherein the optional and/or additional IE may comprise the target node beam information TN-BI.

Some embodiments relate to a method of operating a node 13 for a wireless communications system 10, wherein the node 13 (at least temporarily) is a target node 13 of a handover HO carried out by a user equipment 11 from a source node 12 to the target node 13, the method comprising, cf. FIG. 4: transmitting 300, by the target node, a target node beam information to the source node, wherein the target node beam information characterizes at least one beam of the target node accessed by the user equipment for the handover.

According to some embodiments, a gNB or another network element may be configured to at least temporarily perform the step of transmitting the target node beam information to the source node.

Figure 12:
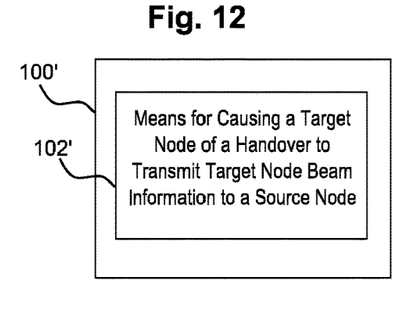

Some embodiments, cf. FIG. 12, relate to an apparatus 100' comprising means 102' for causing a target node 13 (FIG. 3) of a handover HO carried out by a user equipment 11 from a source node 12 to the target node 13 at least to: transmit 300 a target node beam information TN-BI to the source node 12, wherein the target node beam information TN-BI characterizes at least one beam 13a of the target node 13 accessed by the user equipment 11 for the handover HO.

According to some embodiments, the means 102' (FIG. 12) may be configured to cause the target node 13 to perform at least one further step of the embodiments explained above, cf. e.g. the steps 310, 302, 304, 306, 308.

Figure 2:
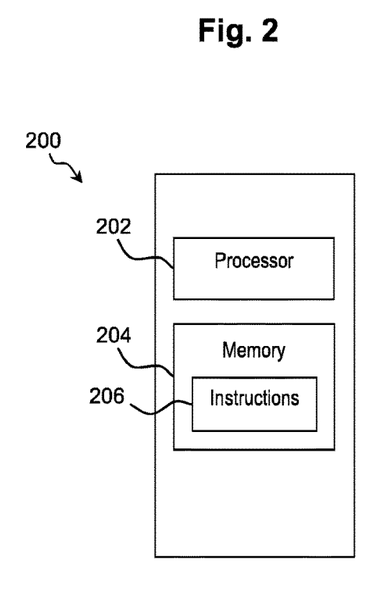
Figure 7:
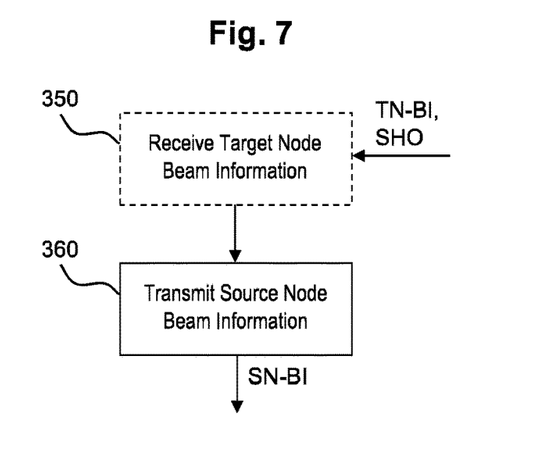

Some embodiments, cf. FIG. 2, relate to an apparatus 200 for a wireless communications system 10, comprising at least one processor 202, and at least one memory 204 storing instructions 206, the at least one memory 204 and the instructions 206 configured to, with the at least one processor 202, cause a source node 12 (FIG. 3), e.g. of a handover HO carried out by a user equipment 11 from the source node 12 to a target node 13, at least to, cf. FIG. 7: transmit 360 a source node beam information SN-BI (also cf. FIG. 3) to the target node 13, wherein the source node beam information SN-BI characterizes a last beam 12a of the source node 12 used by the user equipment 11 for the handover HO.

In some embodiments, the apparatus 200 (FIG. 2) or its functionality, respectively, may be provided in a network element of the communications system 10, for example in a base station 12, e.g. a gNodeB (gNB).

In some embodiments, the apparatus 200 according to the embodiments or its functionality, respectively, may be used for or within wireless communications systems 10, e.g. networks, based on or at least partially adhering to third generation partnership project, 3GPP, radio standards such as 4G E-UTRAN, 5G NR (fifth generation new radio) or other radio access technology. In some embodiments, the apparatus 200 according to the embodiments or its functionality, respectively, may be used for handover procedures HO of 5G NR-based communications systems 10.

According to some embodiments, as mentioned above, the handover HO is a conditional handover, CHO.

According to some embodiments, the instructions 206, when executed by the at least one processor 202, further cause the source node 12 to receive 350 (FIG. 7) a target node beam information TN-BI from the target node 13, wherein the target node beam information TN-BI characterizes at least one beam 13a of the target node 13 accessed by the user equipment 11 for the handover HO.

According to some embodiments, the instructions 206, when executed by the at least one processor 202, further cause the source node 12 to transmit 360 (FIG. 7) the source node beam information SN-BI to the target node 13 upon at least one of: a) receipt 350 of the target node beam information TN-BI, e.g. from the target node 13, b) receipt 350 of a signaling SHO from the target node 13 indicating success of the handover HO.

According to some embodiments, the signaling SHO from the target node 13 indicating success of the handover HO may comprise a message of the "Handover Success" type, cf. above.

According to some embodiments, the instructions 206, when executed by the at least one processor 202, further cause the source node 12 to use a class-2 procedure or a response message of a class-1 procedure according to 3GPP TS 38.423, e.g. version 15.0.0, or 3GPP TS 36.423 for transmitting 360 the source node beam information SN-BI.

Figure 8:
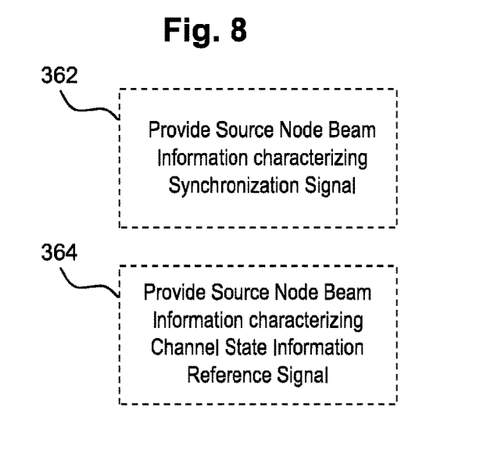

According to some embodiments, the instructions 206, when executed by the at least one processor 202, further cause the source node 12 to perform at least one of, cf. FIG. 8: a) providing 362 the source node beam information SN-BI characterizing at least one synchronization signal associated with the source node 12, b) providing 364 the source node beam information SN-BI characterizing at least one channel state information reference signal, CSI-RS, which characterizes a radio channel between the source node 12 and the user equipment 11.

According to some embodiments, the source node beam information SN-BI may comprise at least one index of the last SSB/or CSI-RS that is Quasi co-located (QCL) with the demodulation reference signals (DMRS) of a PDCCH (Physical Downlink Control Channel)/and or PDSCH (Physical Downlink Share Channel), i.e., beams providing PDCCH and/or PDSCH.

Details related to the concept of Quasi-Colocation according to some embodiments may e.g. be found in 3GPP TS 38.214 V 16.0.0 (2019-12), 5.1.5.

Figure 9:
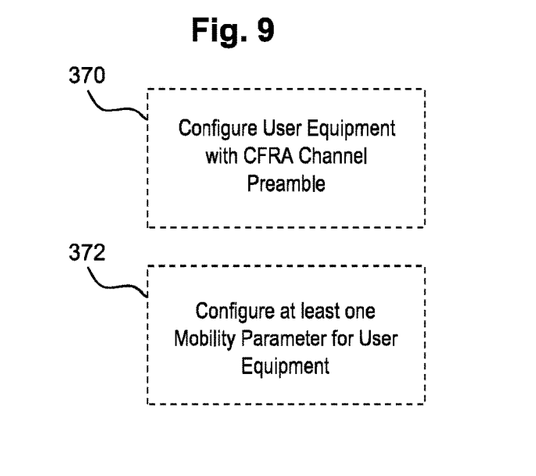

According to some embodiments, the instructions 206, when executed by the at least one processor 202, further cause the source node 12 to, cf. FIG. 9: send and/or configure 370 the user equipment 11 with at least one contention-free random access (CFRA) channel preamble based on the source node beam information SN-BI and the target node beam information TN-BI, also cf. the above examples related to exemplary cells or nodes "A" (e.g., a source node), "B" (e.g., a target node), respectively.

According to some embodiments, the instructions 206, when executed by the at least one processor 202, further cause the source node 12 to: configure 372 at least one mobility parameter for the user equipment 11 based on at least one of the source node beam information SN-BI and the target node beam information TN-BI, e.g. a (currently) serving beam 12a of the source node 12 and, e.g., a strongest beam 13a detected for the target node 13.

According to some embodiments, the least one mobility parameter may be a cell-individual offset, CIO.

According to some embodiments, if there are a lot (e.g., a number exceeding a first threshold) of too early handovers from a source (e.g., currently serving) cell A towards a target cell B on a first beam pair <(source cell A, beam Y1), (target cell B, beam Z1)>, then the serving cell may configure a larger CIO when the UE is served on beam Y1 and detecting a strong beam Z1 from the target cell B, i.e., setting a larger CIO to make the handover(s) later.

Some embodiments relate to a method of operating a node 12 for a wireless communications system 10, wherein the node 12 at least temporarily is a source node 12 of a handover HO carried out by a user equipment 11 from the source node 12 to a target node 13, the method comprising: transmitting 360 (FIG. 7) a source node beam information SN-BI to the target node 13, wherein the source node beam information SN-BI characterizes a last beam 12a of the source node 12 used by the user equipment 11 for the handover HO. According to some embodiments, a gNB 12, 13 or another network element may be configured to at least temporarily perform the step of transmitting the source node beam information to the target node.

According to some embodiments, a gNB 12, 13 or another network element may be configured to at least temporarily perform the step 300 of transmitting the target node beam information to the source node and/or to at least temporarily perform the step 360 of transmitting the source node beam information to the target node. In other words, according to some embodiments, an apparatus or a network element 12, 13 may be configured to at least temporarily perform the step 300 of transmitting the target node beam information to the source node and/or to at least temporarily perform the step 360 of transmitting the source node beam information to the target node, e.g. depending on whether the apparatus or gNB currently acts as a source node or as a (potential) target node for a handover HO.

Figure 13:
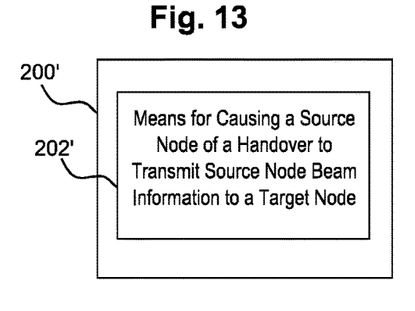

Some embodiments, cf. FIG. 13, relate to an apparatus 200' comprising means 202' for causing a source node 12 of a handover HO carried out by a user equipment 11 from the source node 12 to a target node 13 at least to: transmit 360 a source node beam information SN-BI to the target node 13, wherein the source node beam information SN-BI characterizes at least one beam 12a of the source node 12 used by the user equipment 11 for the handover HO.

According to some embodiments, the means 202' (FIG. 13) may be configured to cause the source node 12 to perform at least one further step of the embodiments explained above, e.g. at least one of the steps 350, 362, 364, 370, 372.

Some embodiments relate to a communications system 10 (FIG. 3) comprising at least one apparatus 100 for a wireless communications system, e.g. a first apparatus 100, comprising at least one processor 102, and memory 104 storing instructions 106 that, when executed by the at least one processor 102, cause a target node 13 of a handover HO carried out by a user equipment 11 from a source node 12 to the target node 13 at least to: transmit 300 a target node beam information TN-BI to the source node 12, wherein the target node beam information characterizes at least one beam 13a of the target node 13 accessed by the user equipment 11 for the handover HO, e.g. during the handover.

According to some embodiments, the system 10 may comprise at least one apparatus 200 for a wireless communications system, e.g. a second apparatus 200, comprising at least one processor 202, and memory 204 storing instructions 206 that, when executed by the at least one processor 202, cause a source node 12 of a handover HO carried out by a user equipment 11 from the source node 12 to a target node 13 at least to: transmit 360 a source node beam information SN-BI to the target node 13, wherein the source node beam information characterizes a last beam of the source node used by the user equipment for the handover.

Some embodiments relate to a communications system 10 comprising at least one network element 12, 13, e.g. a base station, for example gNB, the gNB comprising the first apparatus 100 and/or the second apparatus 200 (and/or, according to some embodiments, at least one of the apparatus 100', 200').

Some embodiments relate to a use of the apparatus according to the embodiments and/or of the method according to the embodiments and/or of the system according to the embodiments for at least one of: a) recording the target node beam information and/or the source node beam information, e.g. by the network, b) planning handovers, e.g. conditional handovers, based on the target node beam information and/or the source node beam information, c) improving mobility robustness, e.g. based on the target node beam information and/or the source node beam information).

Figure 10:
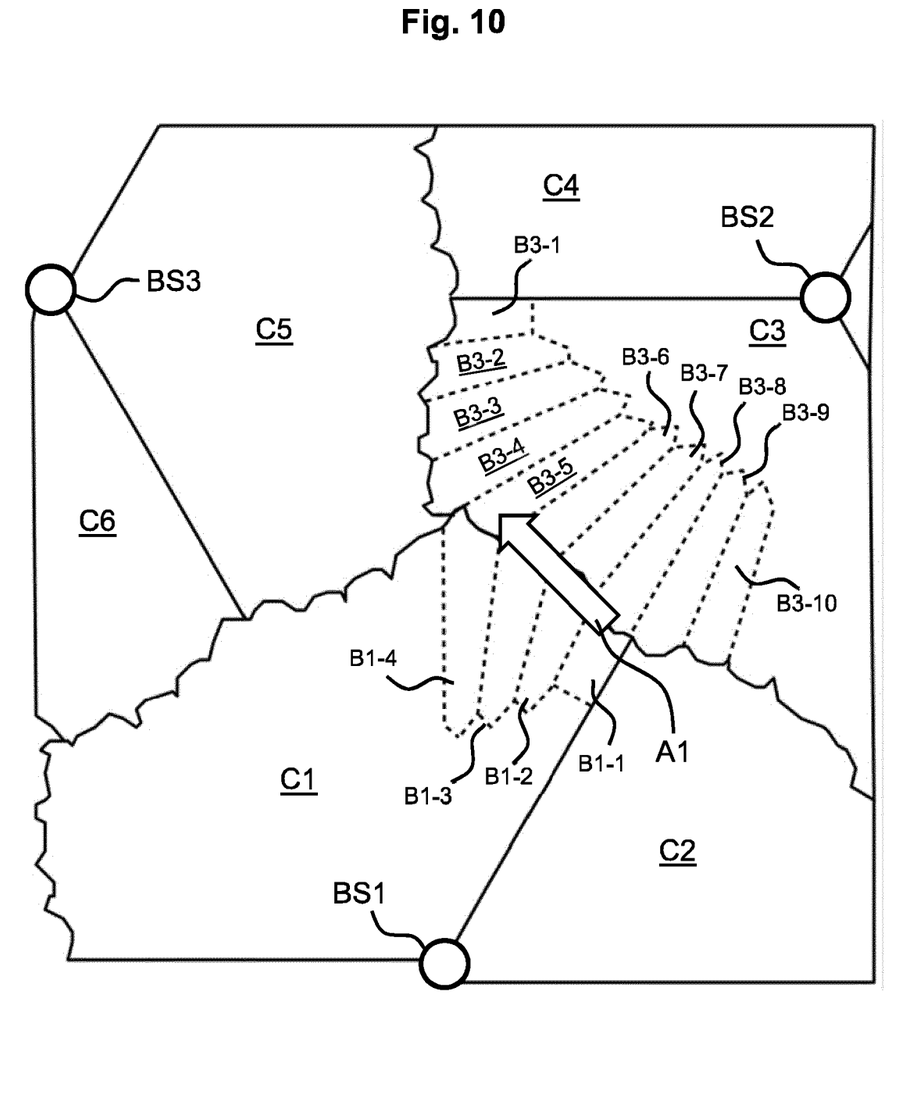

FIG. 10 schematically depicts radio cells C1, C2, C3, C4, C5, C6 provided by three base stations, e.g. gNBs, BS1, BS2, BS3 according to some embodiments. Some (radio) beams of the cell C1 and of the cell C3 are exemplarily depicted, cf. the reference signs B1-1, B1-2, B1-3, B1-4, B3-1, B3-2, . . . , B3-10. Also depicted is a trajectory A1 of an exemplary UE according to some embodiments.

In the following, some aspects of the cells C1, C3 according to some embodiments are explained. Without loss of generality, it can be assumed that the base station BS1 of cell C1 is e.g. similar to the source node 12 of FIG. 3, and that the base station BS2 of cell C3 is similar to the target node 13 of FIG. 3, e.g. in that a UE 11 moving along the trajectory A1 may perform a handover, e.g. CHO, from the cell C1 of base station BS1 to the cell C3 of the base station BS2.

According to some embodiments, the UE 11 (FIG. 3) may be moving, cf. the block arrow A1, from the cell C1 to the cell C3, e.g. performing a CHO. The source cell C1 may e.g. prepare and configure the CHO to the cell C3 at an early stage, when e.g. the UE is within the range of the beam B1-1 and has reported that the beam B3-8 of the cell C3 is the strongest. However, according to some embodiments, the CHO is executed when a CHO execution condition expires, and at this point in time, the UE may have proceeded to beam B1-3, so that e.g. beam B3-5 might be the strongest beam of the potential target cell C3, and therefore, according to some embodiments, the beam B3-5 may selected for RACH and CHO completion.

By using the method according to some embodiments, e.g. transmitting 300 the target node beam information TN-BI and/or transmitting 360 the source node beam information SN-BI, the "true" handover boundary defined by the beam pair B1-3, B3-5 may be recorded by the source node BS1 and/or the target node BS2. According to some embodiments, this recording maybe achieved without support of the UE 11.

According to some embodiments, precise handover boundary information so obtained may be used for planning handovers, etc.

Figure 11:
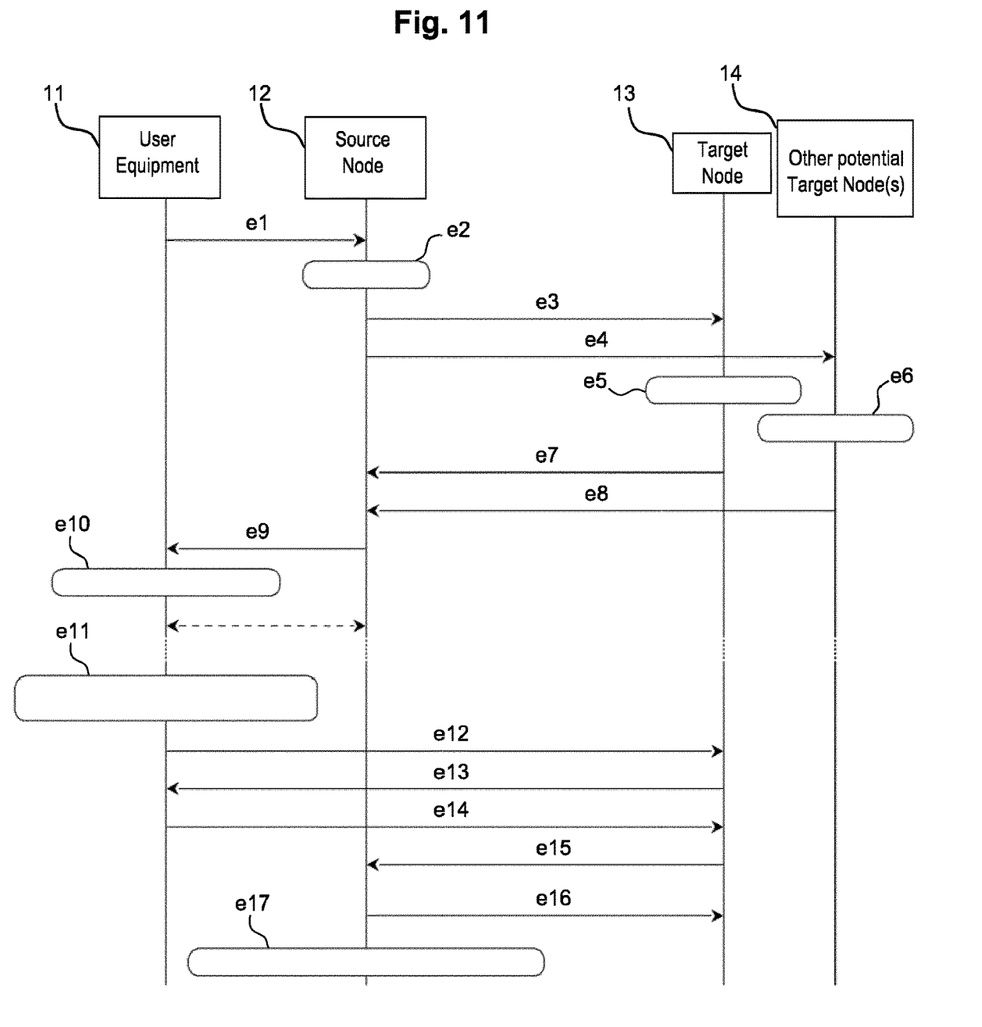

FIG. 11 schematically depicts a simplified flow-chart according to some embodiments. The elements 11, 12, 13 of FIG. 11 correspond with the UE 11, the source node 12, and the target node 13 of FIG. 3. Element 14 of FIG. 11 symbolizes one or more other potential HO (CHO) target nodes.

Element e1 represents a measurement report sent from the UE 11 to the source node 12. According to some embodiments, a configured event may trigger the UE 11 to send the measurement report e1. Based on this report e1, the source node 12 may make a CHO decision e2 and may e.g. prepare one or more target cells for a handover (cf. the CHO Requests e3, e4+corresponding CHO Request Acknowledges e7, e8, after respective admission control procedures e5, e6 of the (further potential) target node(s)).

According to some embodiments, the source node 12 may then send a handover (HO) command e9, e.g. based on an RRC (radio resource control) Reconfiguration message, and the UE 11 evaluates the CHO condition(s) in block e10. In the meantime, according to some embodiments, user data may be exchanged between the UE 11 and the source node 12, cf. the dashed double arrow, and, according to some embodiments, at a later point in time, the CHO condition(s) may be fulfilled, which may be determined by the UE 11 in block e11.

According to some embodiments, the CHO condition(s) may be configured by the source node 12, e.g. in an RRC Reconfiguration message containing the HO command e9. According to some embodiments, once the CHO condition (s) are fulfilled, the UE 11 may send a Physical Random Access Channel (PRACH) Preamble e12 to the target node 13, and may receive a RACH response e13 from the target node 13. According to some embodiments, after that, the UE 11 may signal, cf. arrow e14, to the target node 13 that its reconfiguration for the CHO is complete, e.g. using an RRC Reconfiguration Complete message.

Upon receipt of the signaling e14, the target node 13 may signal handover success, cf. message e15, to the source node 12. According to some embodiments, the signaling message e15 may comprise the target node beam information TN-BI, which may thus be transmitted to the source node 12 using the message e15.

According to some embodiments, upon receipt of the HO success message e15, the source node 12 may cancel CHO in other potentially prepared target nodes/cells 14.

According to some embodiments, optionally, the source node 12 may respond to message e15 with a further message e16 which may e.g. confirm receipt of the target node beam information TN-BI and/or which may comprise the source node beam information, SN-BI.

According to some embodiments, element e17 indicates a stop of data exchange of the source node 12 with the UE 11 and e.g. a start of data forwarding to the target node 13.

According to some embodiments, the message e15 may e.g. form part of a class-2 procedure for transmitting the target node beam information TN-BI to the source node 12.

According to some embodiments, the messages e15, e16 may also form part of a class-1 procedure for transmitting the target node beam information TN-BI to the source node 12 and for transmitting the source node beam information SN-BI to the target node 13.

According to some embodiments, the message e15, e.g. when forming part of a class-1 procedure, may also be denoted as "CHO SON Information", and the message e16, e.g. when forming part of the class-1 procedure, may also be denoted as "CHO SON Information Response".

Even though some embodiments have been described above with reference to an example according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiments. It will be obvious to a person skilled in the art that, as technology advances, the concept according to the embodiments can be implemented in various ways. Further, it is clear to a person skilled in the art that the described embodiments may, but are not required to, be combined with other embodiments in various ways.

The invention claimed is:

1. An apparatus comprising at least one processor, and at least one memory storing instructions, the at least one memory and the instructions configured to, with the at least one processor, cause a source node at least to:
   receive a target node beam information (TN-BI) from a target node, wherein the TN-BI indicates at least one beam of the target node used by a user equipment (11) for a handover from the source node to the target node,
   transmit a source node beam information (SN-BI) to the target node, wherein the SN-BI indicates a last beam of the source node used by the user equipment for the handover;
   send and/or configure the user equipment with at least one contention-free random access channel preamble based on the SN-BI and the TN-BI.

2. The apparatus according to claim 1, wherein the SN-BI further includes at least one index of a synchronization signal block associated with the source node and/or at least one index of a channel state information reference signal, CSI-RS, which characterizes a radio channel between the source node and the user equipment.

3. The apparatus according to claim 1, wherein the instructions, when executed by the at least one processor, further cause the source node to: configure at least one mobility parameter for the user equipment based on at least one of the SN-BI and the TN-BI.

4. The apparatus according to claim 1, wherein the SN-BI comprises an index of last SSB and/or CSI-RS that is quasi co-located with demodulation reference signals (DMRS) of a Physical Downlink Control Channel (PDCCH) and/or a Physical Downlink Shared Channel (PDSCH).

5. A method comprising:
  receiving a target node beam information (TN-BI) from a target node, wherein the TN-BI indicates at least one beam of the target node used by a user equipment for a handover from the source node to the target node;
  transmitting a source node beam information (SN-BI) to the target node, wherein the SN-BI indicates a last beam of the source node used by the user equipment for the handover;
  sending and/or configuring the user equipment with at least one contention-free random access channel preamble based on the SN-BI and the TN-BI.

6. The method according to claim 5, wherein the SN-BI further includes at least one index of a synchronization signal block associated with the source node and/or at least one index of a channel state information reference signal, CSI-RS, which characterizes a radio channel between the source node and the user equipment.

7. The method according to claim 5, wherein the method further comprises configuring at least one mobility parameter for the user equipment based on at least one of the SN-BI and the TN-BI.

8. The method according to claim 5, wherein the SN-BI comprises an index of last SSB and/or CSI-RS that is quasi co-located with demodulation reference signals (DMRS) of a Physical Downlink Control Channel (PDCCH) and/or a Physical Downlink Shared Channel (PDSCH).

* * * * *